(12) United States Patent
Hoggatt et al.

(10) Patent No.: US 10,822,791 B2
(45) Date of Patent: Nov. 3, 2020

(54) DRAINAGE AND VENTILATION MAT FOR BUILDING EXTERIOR WALL, ROOF AND BASEMENT ASSEMBLIES

(71) Applicants: John G. Hoggatt, Hudson, WI (US); Sarah B. Atkins Hoggatt, Hudson, WI (US)

(72) Inventors: John G. Hoggatt, Hudson, WI (US); Sarah B. Atkins Hoggatt, Hudson, WI (US)

( * ) Notice: Subject to any disclaimer, the term of this patent is extended or adjusted under 35 U.S.C. 154(b) by 0 days.

(21) Appl. No.: 15/877,798

(22) Filed: Jan. 23, 2018

(65) Prior Publication Data

US 2018/0209140 A1 Jul. 26, 2018

Related U.S. Application Data

(60) Provisional application No. 62/449,354, filed on Jan. 23, 2017.

(51) Int. Cl.

| | |
|---|---|
| *E04B 1/70* | (2006.01) |
| *E04C 2/52* | (2006.01) |
| *E04C 2/20* | (2006.01) |
| *B32B 5/02* | (2006.01) |
| *B32B 5/12* | (2006.01) |
| *E04D 13/04* | (2006.01) |
| *E04D 13/17* | (2006.01) |
| *E04C 2/42* | (2006.01) |

(52) U.S. Cl.
CPC ............... *E04B 1/70* (2013.01); *B32B 5/028* (2013.01); *B32B 5/12* (2013.01); *E04C 2/20* (2013.01); *E04C 2/427* (2013.01); *E04C 2/526* (2013.01); *E04D 13/0477* (2013.01); *E04D 13/17* (2013.01); *B32B 2419/00* (2013.01); *E04C 2/42* (2013.01)

(58) Field of Classification Search
CPC ... E04B 1/70; E04C 2/526; E04C 2/20; E04C 2/42; E04D 13/0477; B32B 5/028; B32B 5/12; B32B 2419/00
USPC ........ 52/128–143, 302.1, 664, 676; 442/208, 442/43, 286, 290
See application file for complete search history.

(56) References Cited

U.S. PATENT DOCUMENTS 1,372,741 A * 3/1921 Dickinson ............... E04F 13/04
 52/671
2,798,600 A * 7/1957 O'Konski .......... B65D 71/0092
 206/597

(Continued)

*Primary Examiner* — Brian E Glessner
*Assistant Examiner* — Adam G Barlow
(74) *Attorney, Agent, or Firm* — Skinner and Associates; Joel D. Skinner, Jr.

(57) ABSTRACT

A drainage and ventilation mat for use in building exterior walls, roofs and basement assemblies that addresses all three of the following major concerns: drainage, cross ventilation/air flow, and compressive strength. The drainage and ventilation mat includes two layers of parallel, square strands that are overlaid at angles to create a diamond-shaped netting of two layers which provides an air space for horizontal and vertical air movement and protects the drainage plane behind it. The mat features a high compressive strength that creates an air space that can withstand extreme construction and environmental forces. The netting is configured with or without a scrim to accommodate a variety of exterior wall, roof and basement assemblies drainage and ventilation needs.

16 Claims, 12 Drawing Sheets

(56) References Cited

U.S. PATENT DOCUMENTS

| | | | | |
|---|---|---|---|---|
| 3,740,911 A * | 6/1973 | O'Leary | E04F 13/0862 | 52/388 |
| 4,706,430 A * | 11/1987 | Sugita | E04C 5/07 | 52/309.16 |
| 4,898,761 A * | 2/1990 | Dunaway | B32B 27/02 | 156/244.18 |
| 5,836,135 A * | 11/1998 | Hagan | E04B 1/762 | 52/836 |
| 6,355,333 B1 * | 3/2002 | Waggoner | E04B 1/62 | 428/174 |
| 6,550,212 B2 * | 4/2003 | Lubker, II | B32B 5/12 | 52/302.1 |
| 7,520,097 B2 * | 4/2009 | Aalbers | B32B 27/12 | 52/302.1 |
| 8,684,277 B2 * | 4/2014 | Blanke | E04F 15/18 | 237/69 |
| 8,966,845 B1 * | 3/2015 | Ciuperca | E04F 13/047 | 52/405.3 |
| 9,656,445 B2 * | 5/2017 | Lubker, II | E04B 1/625 | |
| 2004/0045242 A1 * | 3/2004 | Lake | B32B 21/10 | 52/396.02 |
| 2004/0229012 A1 * | 11/2004 | Lubker, II | D03D 15/0083 | 428/131 |
| 2004/0255533 A1 * | 12/2004 | Koester | E04B 1/70 | 52/302.1 |
| 2005/0287338 A1 * | 12/2005 | Lubker, II | E04B 1/625 | 428/131 |
| 2006/0194494 A1 * | 8/2006 | Lubker, II | E04F 13/0864 | 442/208 |
| 2006/0194495 A1 * | 8/2006 | Lubker, II | D06N 3/123 | 442/208 |
| 2006/0211321 A1 * | 9/2006 | Lubker, II | E04B 1/625 | 442/208 |
| 2007/0144110 A1 * | 6/2007 | Aalbers | B32B 3/12 | 52/782.1 |
| 2009/0173024 A1 * | 7/2009 | Ozaki | E04F 10/00 | 52/302.1 |
| 2009/0193738 A1 * | 8/2009 | Kortuem | E02D 31/02 | 52/302.1 |
| 2010/0019014 A1 * | 1/2010 | Rodenhouse | B25C 5/1693 | 227/32 |
| 2010/0043326 A1 * | 2/2010 | Koester | E04B 2/707 | 52/302.1 |
| 2010/0107531 A1 * | 5/2010 | Hunsaker | E04F 13/0862 | 52/314 |
| 2011/0258944 A1 * | 10/2011 | Radoane | E04B 1/665 | 52/62 |
| 2012/0247040 A1 * | 10/2012 | Buoni | E04F 13/047 | 52/302.1 |
| 2013/0276392 A1 * | 10/2013 | Johnson | E04B 1/665 | 52/302.1 |

\* cited by examiner

DRAINAGE AND VENTILATION MAT FOR BUILDING EXTERIOR WALL, ROOF AND BASEMENT ASSEMBLIES

CROSS-REFERENCE TO RELATED APPLICATIONS, IF ANY

This application claims the benefit under 35 U.S.C. § 119(e) of U.S. Provisional Patent Application Ser. No. 62/449,354, filed Jan. 23, 2017, which is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND

1. Field

The present invention relates, generally, to building systems, apparatus and methods. Particularly, the invention relates to a drainage and ventilation mat for building exterior walls, roofs and basement assemblies.

2. Background Information

A drainage mat for use in building structures, particularly in exterior walls, roofs and below-grade locations. Moisture management is a very important factor to ensure problem-tree performance of any building enclosure system. No cladding system is completely water-tight and no installation is perfect. Moisture will find its way into exterior walls from rainwater intrusion and infiltration of outside, moisture-laden air through gaps, penetrations, and cracks in the surface of the cladding material.

The best method to control this moisture is to ensure that it is effectively drained down and out of the exterior wall assembly while also providing a means for cross ventilation that will allow remaining moisture vapor to decrease during drying periods. By increasing the assembly's drainage and drying abilities, the risk of moisture-related problems decreases. The present invention achieves these objectives with the added benefit of extreme compressive strength.

If a drainage mat compresses too easily, the desired air space can collapse which would impede water and air flow. In an exterior lap siding application such as cement board siding, a compressible drainage mat can allow nails to penetrate at irregular depths which causes a dimpled appearance and/or waved deformation of the siding. In an exterior Portland cement-based plaster (colloquially known as "stucco"), or an Exterior Insulation and Finish Systems (EIFS) assembly, drainage mat compression can lead to cracks in the building exterior surface caused by wind pressure and air pressure differentials. Compressive strength is equally important in a roof assembly when considering the weight of roofing materials, snow and winds loads, as well as load requirements on green roofs. Below grade wall assemblies also have high load requirements for soil and water pressure.

A variety of moisture control and drainage mat inventions have been developed. One version of these products is a building wrap with a drainage component built into or attached to it. The air space these products create is minute and offers very little ventilation or air flow capacity.

Other versions of these products create and maintain a cavity for drainage and cross ventilation with an engineered capillary break (greater than 0.1875"). Some provide good drainage and cross ventilation and others provide a relatively high compressive strength, but none excel in all three of these categories.

Therefore, a need still exists in the field for a material that addresses all three of the major concerns: drainage, cross ventilation and compressive strength.

BRIEF SUMMARY

The invention provides a drainage and ventilation mat for building exterior walls, roofs and basement assemblies, and methods of manufacture and use therefor, which are practical, reliable, and efficient, and which are believed to fulfill the need and to constitute an improvement over the background technology.

The invention provides a diamond-shaped, two-layered extruded plastic netting. The netting is made from high density polyethylene (HDPE) and can be made using other types of plastic. Two layers of parallel strands are overlaid at angles to create netting which provides for horizontal and vertical air movement as well as an air space behind the exterior cladding for moisture drainage. Each strand is square to provide superior compressive strength that will keep the air space intact even under extreme construction and environmental forces.

In one embodiment of the present invention, the netting is configured alone, without any fabric scrim on either side, to accommodate lap siding exterior walls and some roof assemblies.

In another embodiment of the present invention, the netting is configured with a breathable fabric scrim on one side to accommodate assemblies which include Portland cement plaster, exterior insulation finish systems (EIFS), and adhered veneers, as well as roofing and basement applications where excellent drainage, ventilation and compressive strength is required. The inclusion of a fabric scrim prevents cementations construction materials (in the case of Portland cement plaster, EIFS or adhered veneer applications), debris (in the case of roofing applications), or dirt (in the case of below grade applications) from passing into and clogging the drainage and air flow capabilities of the diamond-shaped, two-layered netting.

In another embodiment of the present invention, the netting is configured with a breathable fabric scrim on one side and a weather-resistive barrier ("WRB") attached to the alternate side. This embodiment will accommodate exterior wall assemblies which include Portland cement plaster, exterior insulation finish systems (EIFS), and adhered veneers that also require a WRB.

In another embodiment of the present invention, the netting is configured with a weather-resistive barrier ("WRB") attached to one side. This embodiment will accommodate lap siding exterior and some roof assemblies that also require a WRB.

The aspects, features, advantages, benefits and objects of the invention will become clear to those skilled in the art by reference to the following description, claims and drawings.

DETAILED DESCRIPTION

Figure 1:
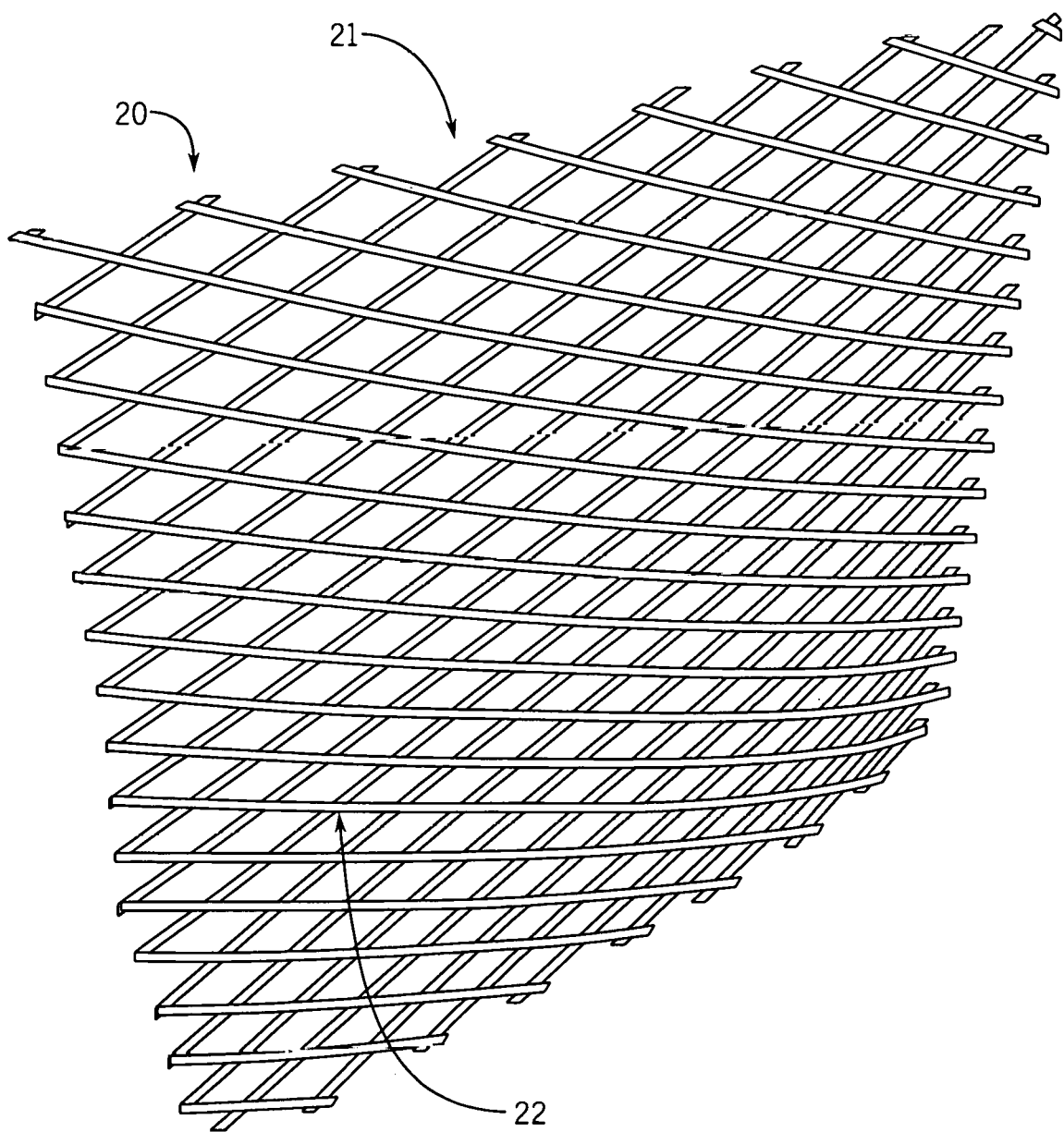
FIG. 1—is a perspective view of the drainage and ventilation mat according to an embodiment of the present invention without scrim.

FIG. 1 shows one embodiment of the inventive, drainage and ventilation mat 20 that has two layers of square-shape extruded plastic strands 21 that are thermally bonded in a crisscrossed pattern to create a diamond-shaped, two-layered netting 22.

Figure 2:
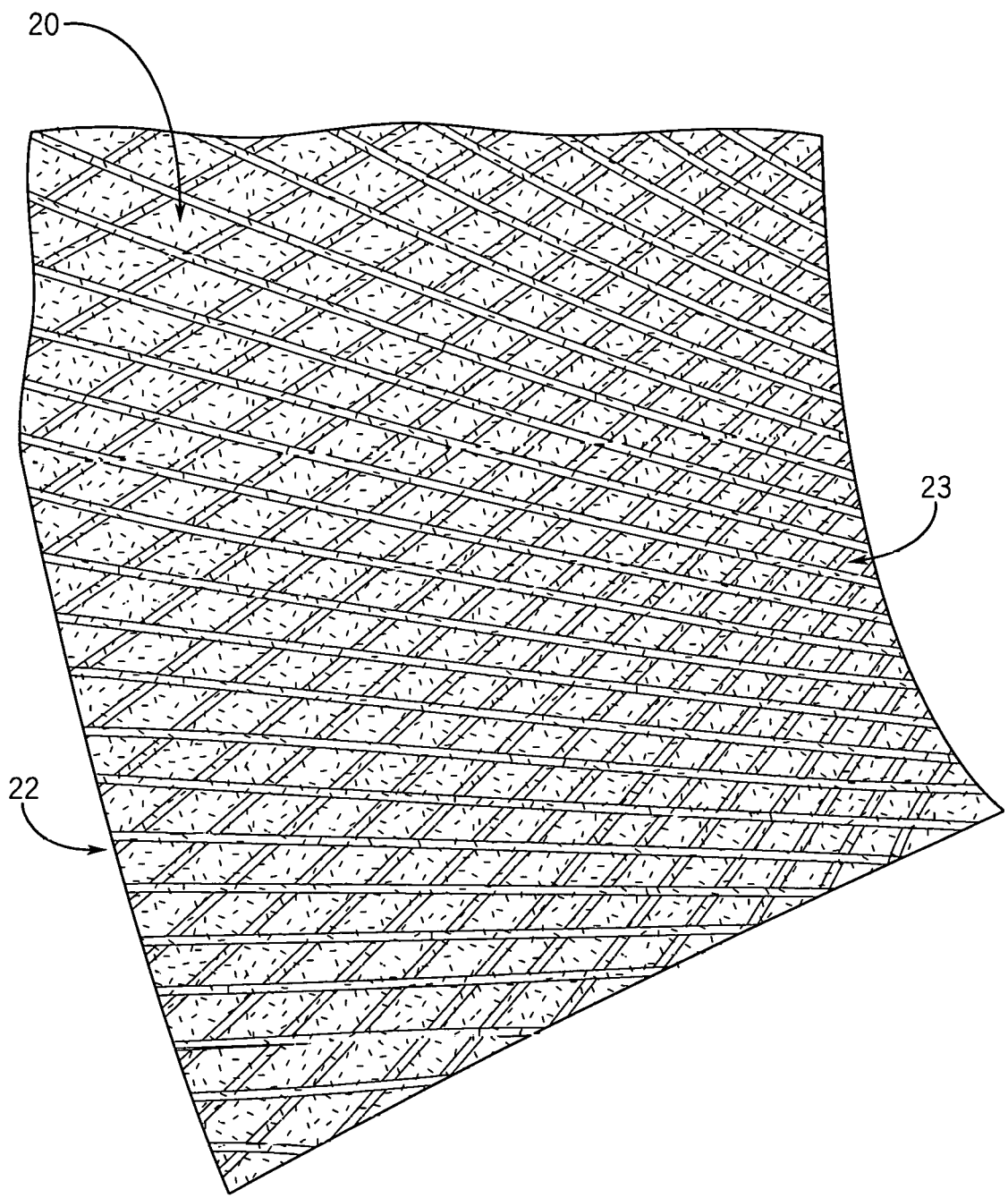
FIG. 2—is a perspective view of the drainage and ventilation mat according to another embodiment of the present invention that includes a breathable fabric scrim component.

FIG. 2 shows an alternate embodiment of the inventive drainage and ventilation mat 20 with a breathable fabric scrim 23 that is bonded to the diamond-shaped, two-layered netting 22. In this embodiment, the two materials can be thermally bonded, or the fabric may be adhered in a number of manners without heat including, but not limited to, the use of an adhesive.

Figure 3:
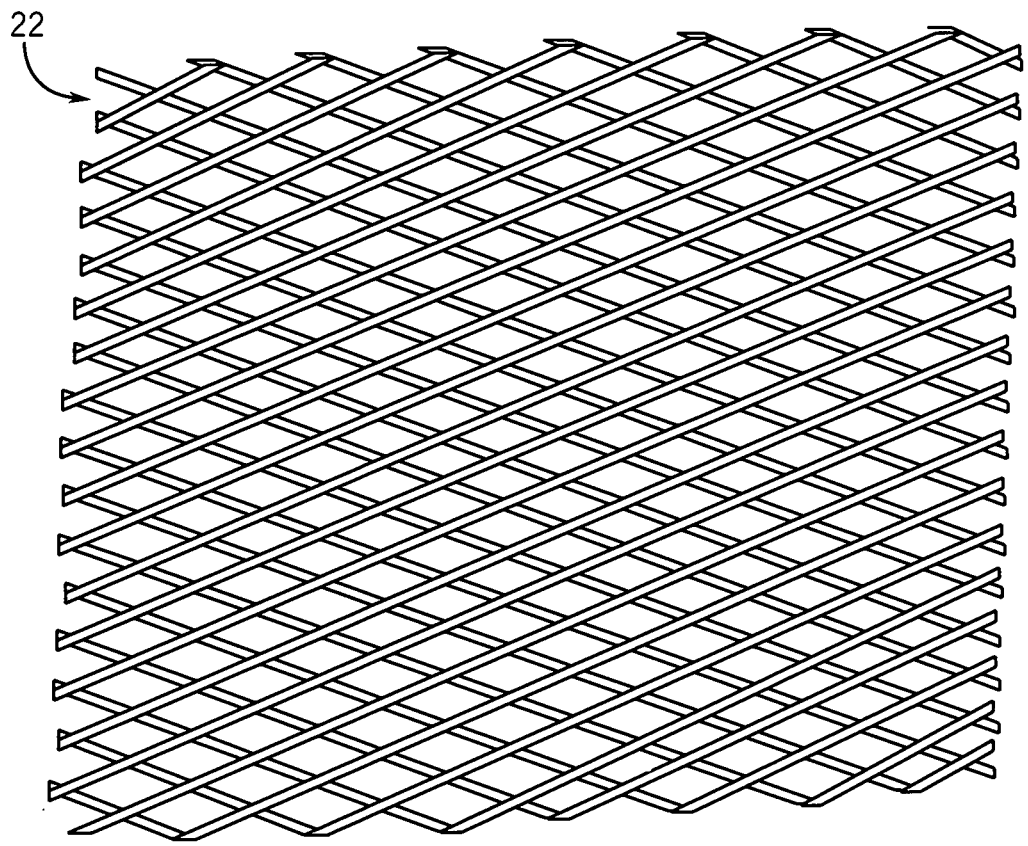
FIG. 3—is a front view of the embodiment depicted in FIG. 1. The back view of the embodiment depicted in FIG. 1 is identical to the front view.

FIG. 3 shows the diamond-shaped, two-layered netting 22 without, scrim from the front, which is the same as the back view. The netting 22 is made from High Density Polyethylene (HDPE), which remains flexible down to −40 degrees Fahrenheit. Other plastics may be used to make the netting 22 including, but not limited to Polyphenylene Ether (PPE). It includes a flame retardant to meet building codes.

Figure 4:
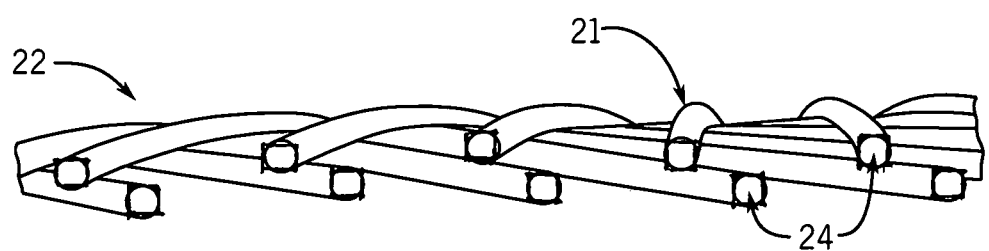
FIG. 4—is a cross-sectional view the embodiment depicted in FIG. 1.

FIG. 4 is a cross section view of the diamond-shaped, two-layered netting 22, highlighting the square-shaped extruded plastic strands 21 that create the two crisscrossing layers. The two crisscrossing layers allow moisture and air to pass through the mat in both vertical and horizontal directions when placed between two solid materials. The square-shaped extruded strands 21 give the netting 22 high compressive strength. The range of thicknesses of the two layers combined are, but not limited to, 0.1875 in. to 0.25 in. The mesh may have up to 6 layers and be 1 in. or more thick.

Figure 5:
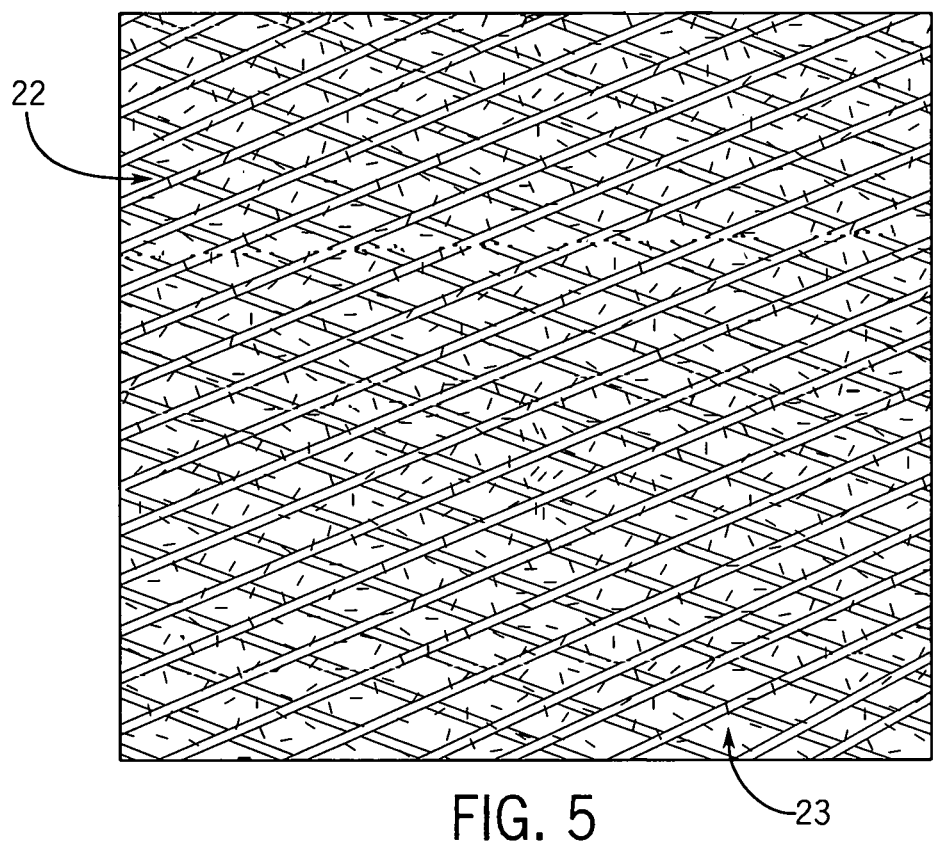
FIG. 5—is a front view of the embodiment depicted in FIG. 2.
Figure 6:
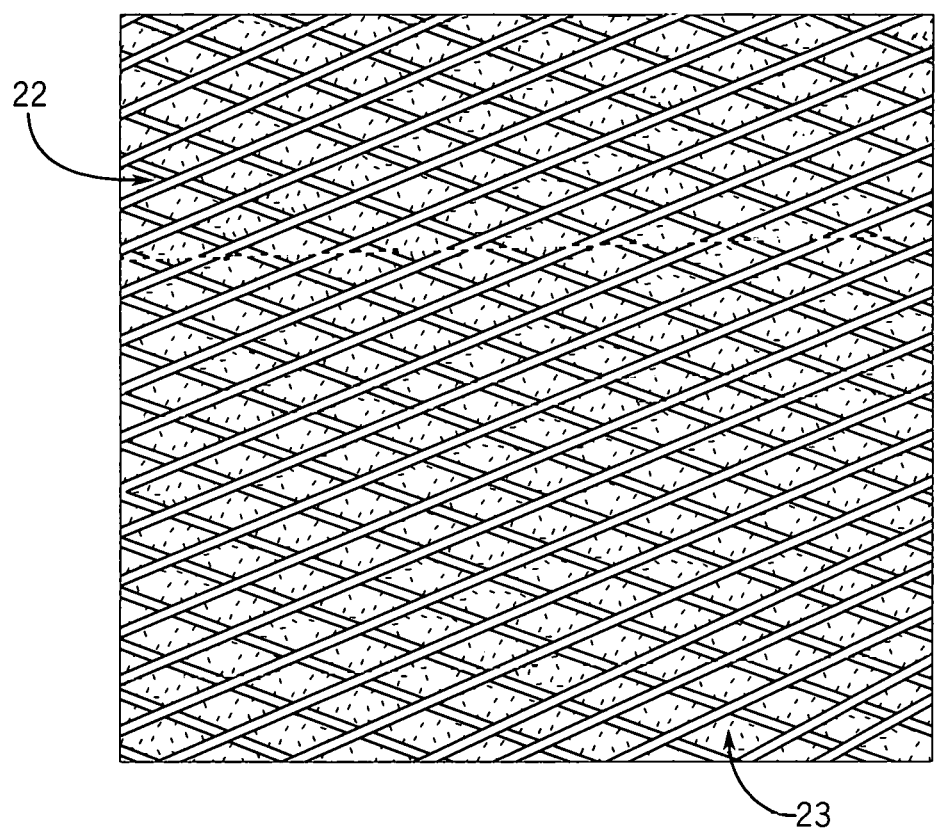
FIG. 6—is a back, view of the embodiment depicted in FIG. 2.

FIG. 5 is a front view of the netting 22 with breathable fabric scrim 23 and FIG. 6 shows a view of the backside of the netting 22 with a fabric scrim 23.

Figure 7:
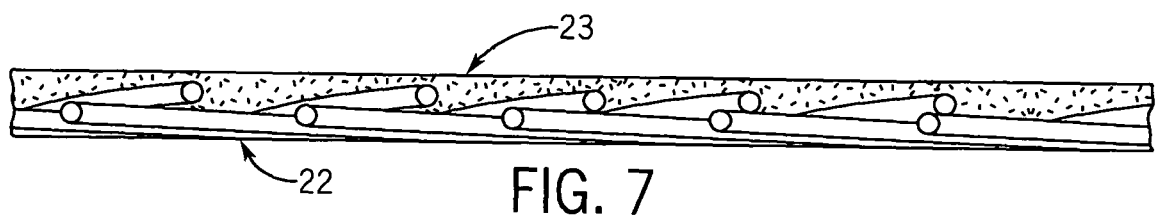
FIG. 7—is a cross-sectional view the embodiment depicted in FIG. 2.

FIG. 7 is a cross section view of the netting 22 with a breathable fabric scrim 23 bonded to one side.

Figure 8:
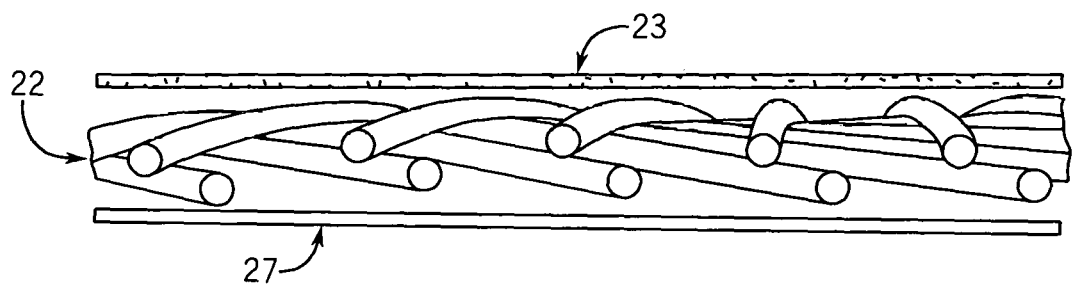
FIG. 8—is a cross-sectional view of the drainage and ventilation mat according to another embodiment of the present invention that includes a breathable fabric scrim component on one side and a weather-resistive barrier on the other side. This is a two scrim arrangement.

FIG. 8 is a cross section view of the netting 22 with breathable fabric scrim 23 bonded to one side aid a weather-resistive barrier 21 bonded to the other side. This is a two scrim arrangement.

Figure 9:
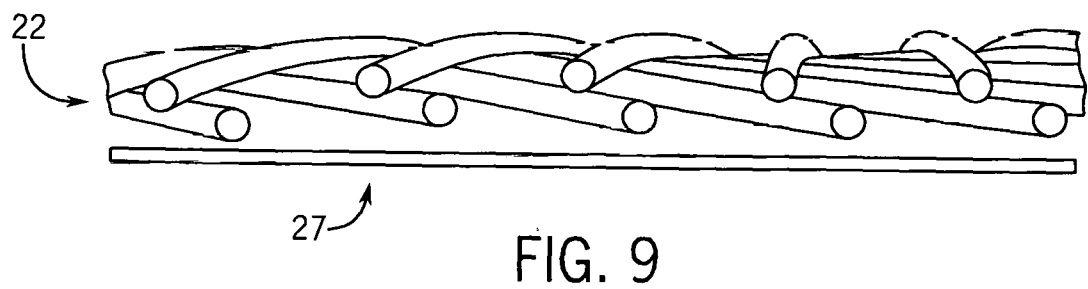
FIG. 9—is a cross-sectional view of the drainage and ventilation mat according to another embodiment of the present invention that includes a weather-resistive barrier on one side. This is a single WRB arrangement.

FIG. 9 is a cross section view of the netting 22 with a weather-resistive barrier 27 (WRB) bonded to one side. This is an arrangement with only an WRB.

Figure 10:
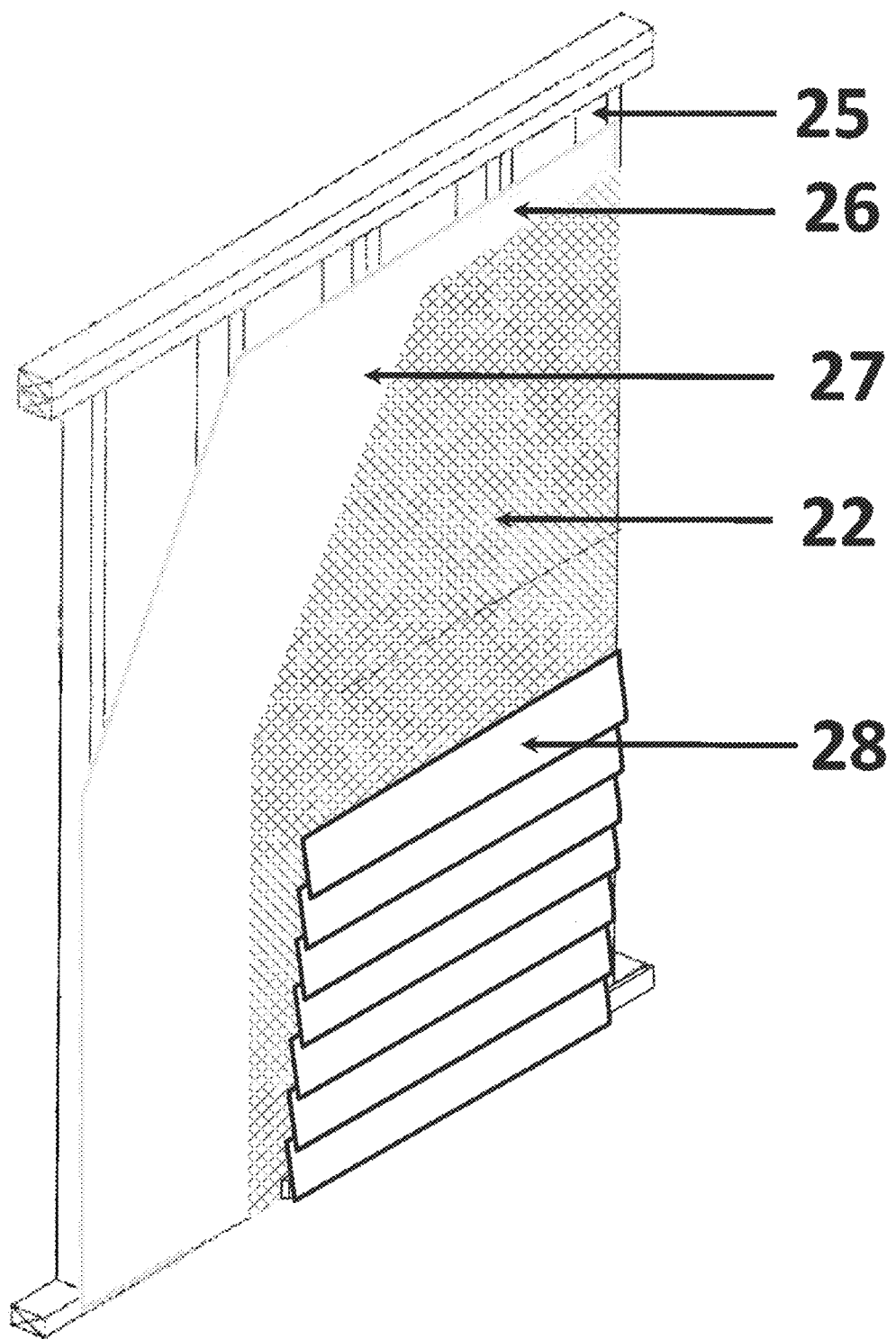
FIG. 10—is a perspective view of an exterior wall construction for a building with a lap siding cladding assembly according to the embodiment depicted in FIG. 1 or FIG. 9.

FIG. 10 is a perspective view of an exterior wall that has a lap siding cladding 28. The key components of this wall assembly include interior wall framing 25, sheathing 26, a weather resistive barrier 27, the diamond-shaped, two-layered netting 22 for drainage, cross ventilation and compressive strength to maintain the drainage plane behind the lap siding cladding 28. The high compressive strength of the diamond-shaped netting 22 will prevent dimpling and cursing of the lap siding cladding 28 during and after construction. This construction can use the embodiment seen in FIG. 1 or FIG. 9.

Figure 11:
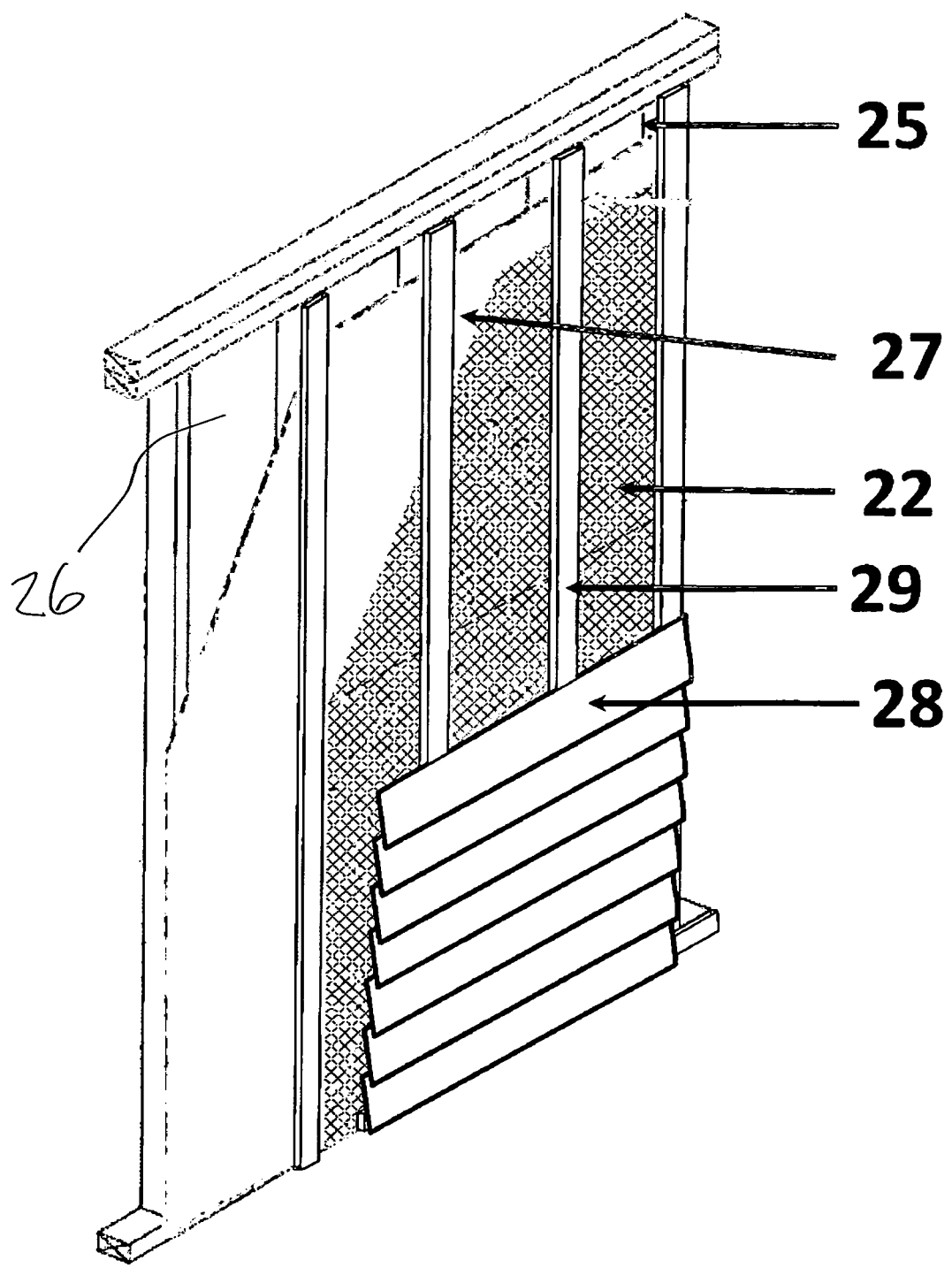
FIG. 11—is a perspective view of a an exterior wall construction for a building with a lap siding cladding assembly according to the embodiment depicted in FIG. 1 or FIG. 9 similar to FIG. 10 with the addition offering strips.

FIG. 11 is a cross section view of the netting 22 with breathable fabric scrim 23 bonded to one side and a weather-resistive barrier 27 bonded to the other side. This is a two scrim arrangement.

Figure 12:
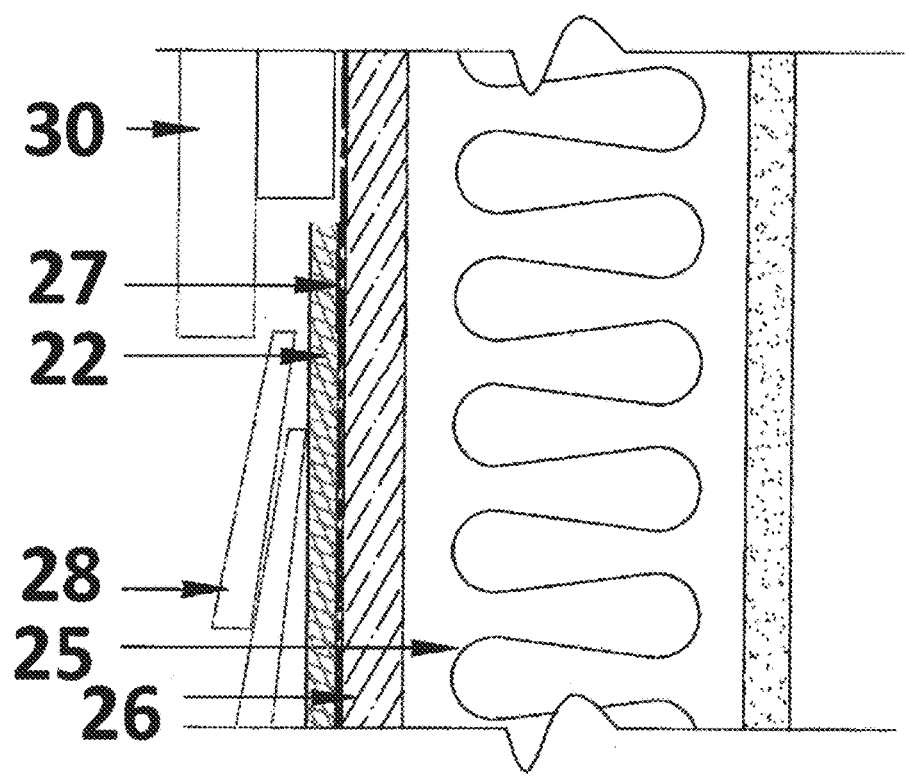
FIG. 12—is a cross-sectional detail of a lap siding cladding assembly at the top of an exterior wall according to the embodiment depicted in FIG. 1 or FIG. 9.

FIG. 12 is a cross section view of the netting 22 with a weather-resistive barrier 27 (WRB) bonded to one side. This is an arrangement with only an WRB.

Figure 13:
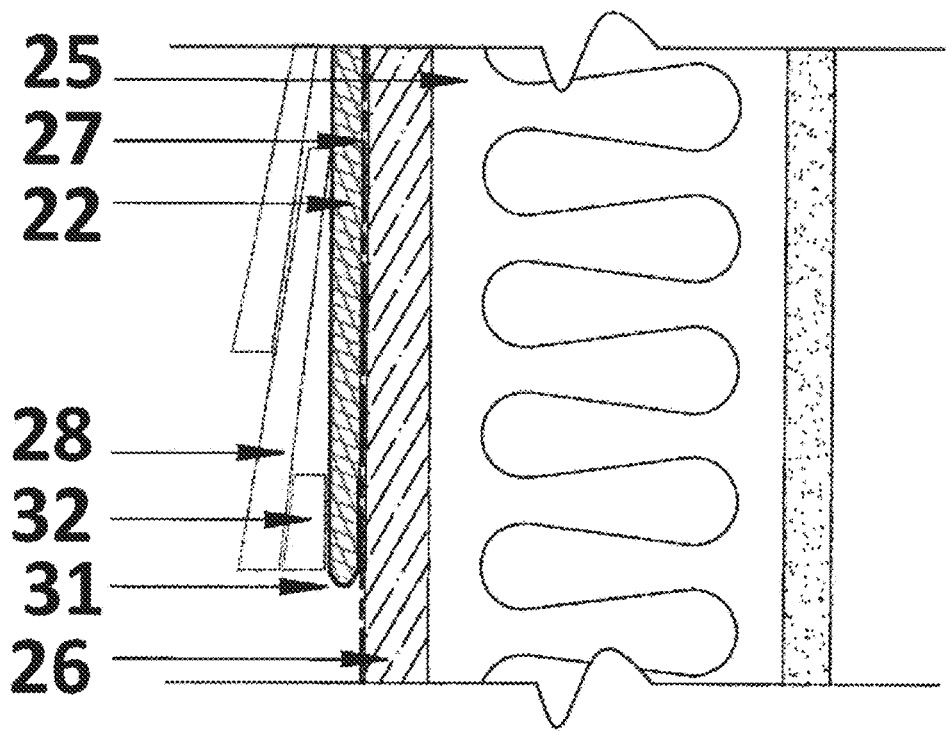
FIG. 13—is a cross-sectional detail of a lap siding cladding assembly at the bottom of an exterior wall according to the embodiment depicted in FIG. 1 or FIG. 9.

FIG. 13 is a perspective view of an exterior wall that has a lap siding cladding 28. The key components of this wall assembly include interior wall framing 25, sheathing 26, a weather resistive barrier 27, the diamond-shaped, two-layered netting 22 for drainage, cross ventilation and compressive strength to maintain the drainage plane behind the lap siding cladding 28. The high compressive strength of the diamond-shaped netting 22 will prevent dimpling and curving of the lap siding cladding 28 during and after construction. This construction can use the embodiment seen in FIG. 1 or FIG. 9.

Figure 14:
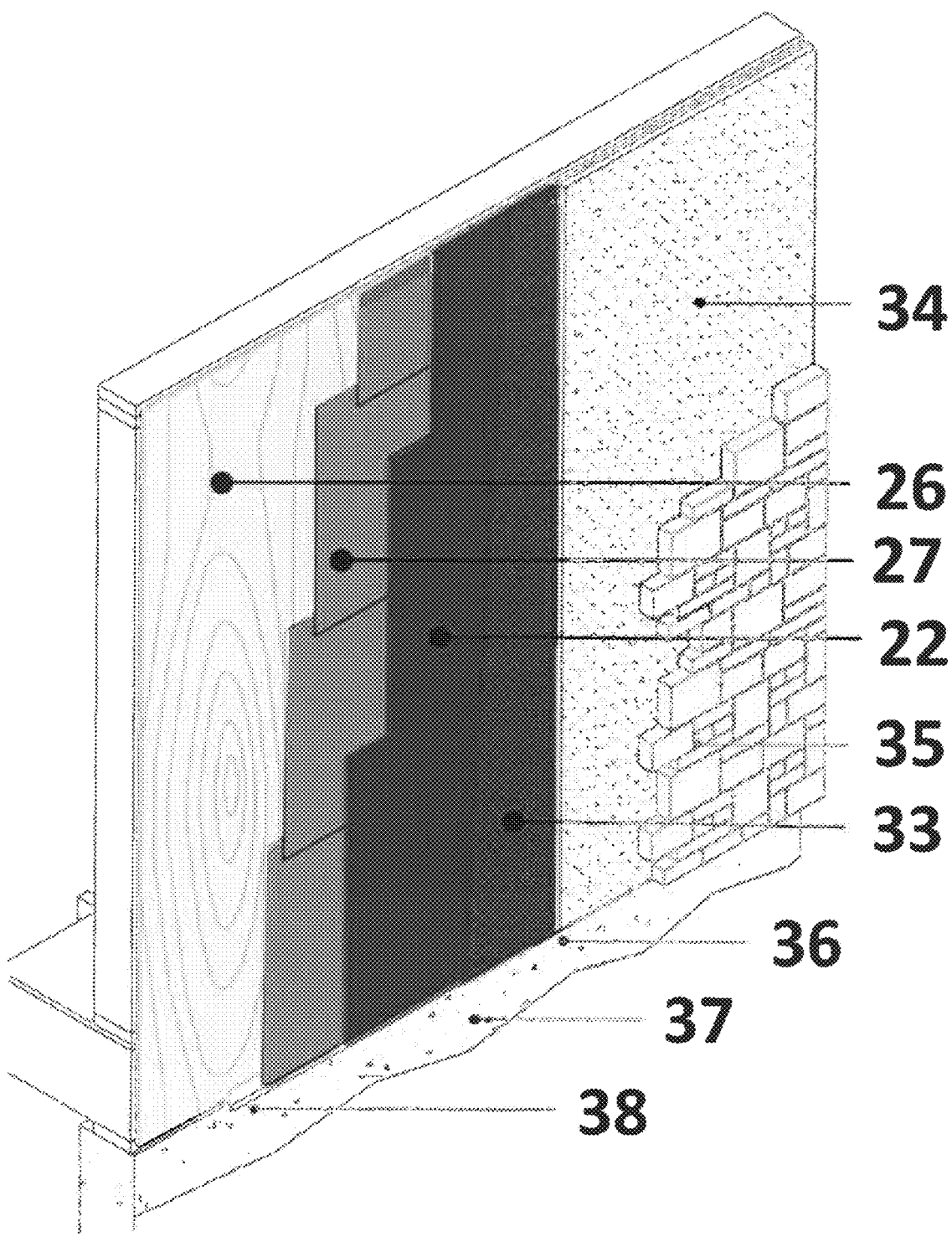
FIG. 14—is a perspective view of an adhered veneer wall assembly according to the embodiment deplected in FIG. 2 or FIG. 8.

FIG. 14 is a perspective view of an adhered veneer wall assembly. The key components of this wall assembly include sheathing 26, a weather resistive barrier 27, diamond-shaped, two-layered netting 22 with scrim for drainage, cross ventilation and compressive strength to maintain the drainage plane behind the lath and a mortar bed 33 and a manufactured stone cladding 35. Additional components shown here are expanded flange casing bead with weep 36, the foundation 37, and a weep screed 38. Other adhered veneer claddings include, but are not limited to Portland cement plaster, thin brick and Exterior Insulation and finish system (EIFS).

Figure 15:
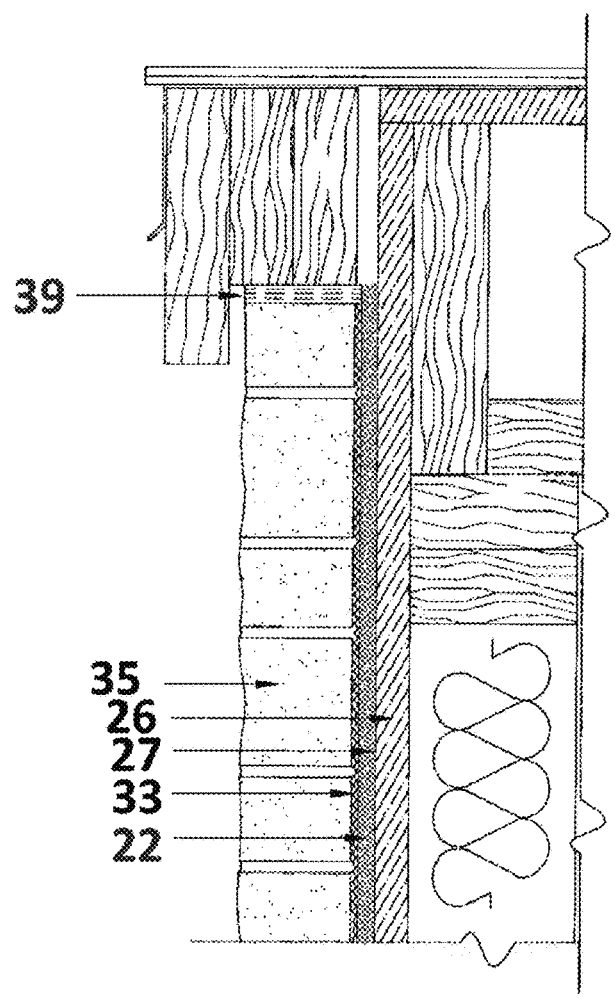
FIG. 15—is a cross-sectional detail of an adhered veneer wall assembly at the top of an exterior wall according to the embodiment depicted in FIG. 2 or FIG. 8.

FIG. 15 is a detailed drawing of a manufactured stone cladding 35 at the top of a wall. Components shown here are the veneer vent 39, manufactured stone cladding 35, sheathing 26, a weather resistant barrier 27, a diamond-shaped, two-layered netting 22 shown here with scrim which is necessary to maintain an airspace for drainage, cross ventilation and compressive strength, lath and a mortar bed 33 and a manufactured stone cladding 35. The veneer vent 39 serves as a mechanism to aid in the ventilation of the airspace created by the diamond-shaped netting 22 with scrim.

Figure 16:
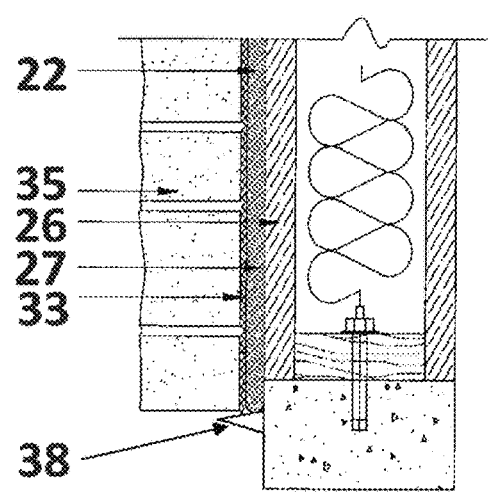
FIG. 16—is a cross-sectional detail of an adhered veneer wall assembly at the bottom of an exterior wall according to the embodiment depicted in FIG. 2 or FIG. 8.

FIG. 16 is a detailed drawing of a manufactured stone cladding 35 at the bottom of a wall. Components shown here are sheathing 26, a weather resistant barrier 27, a diamond-shaped, two-layered netting 22 shown here with scrim which is necessary to maintain an airspace for drainage, cross ventilation and compressive strength, lath, a mortar bed 33, manufactured stone cladding 35 and a weep screed 38. The weep screed 38 serves as a mechanism to aid in the drainage and ventilation of the airspace created by the diamond-shaped netting 22 with scrim.

Figure 17:
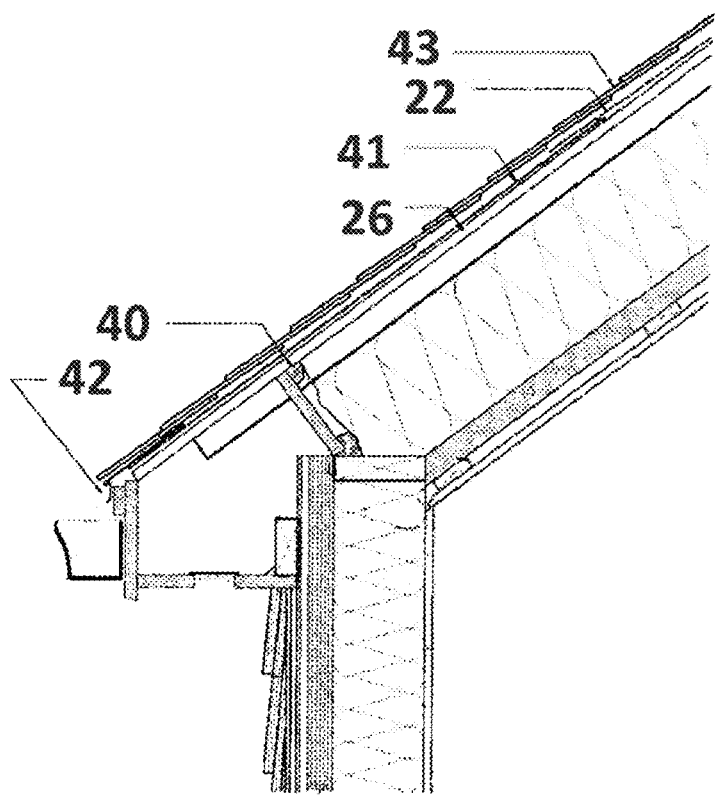
FIG. 17—is a cross-sectional detail of an asphalt shingled roof assembly according to the embodiment depicted in FIG. 1 or FIG. 2 or FIG. 8 or FIG. 9.

FIG. 17 is a detailed drawing of an asphalt shingled roof assembly. Key components shown here include rigid insulation 40, sheathing 26, self-adhered membrane 41, diamond-shaped, two-layered netting 22 with or without scrim to maintain an air space for drainage, cross ventilation and compressive strength, asphalt shingles 43 and a metal drip edge 42. Other roofing systems that can utilize a diamond-shaped, two-layered netting 22 include, but are not limited to metal roofs, green roofs, asphalt and gravel roofs and rubber membrane roofs.

Figure 18:
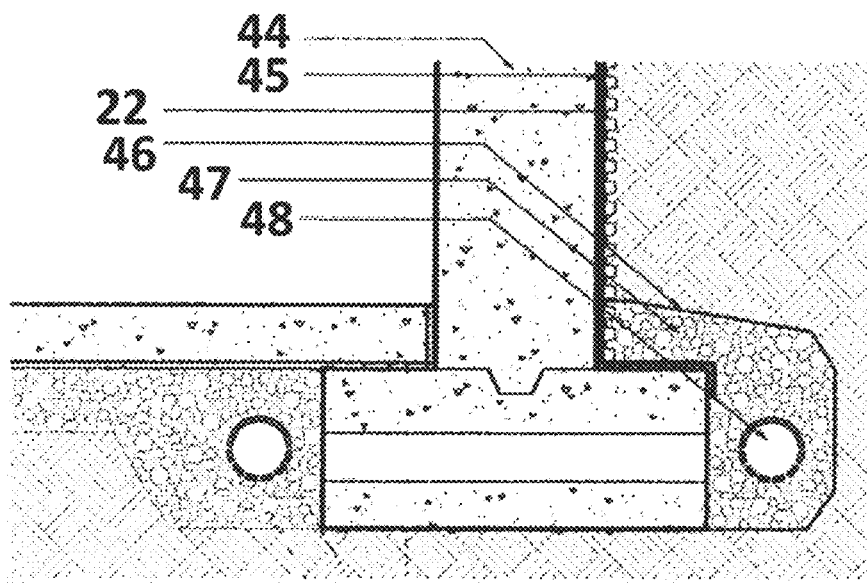
FIG. 18—is a cross-sectional detail of a basement wall assembly at the bottom according to the embodiment depicted in FIG. 2 or FIG. 8.

FIG. 18 is a detailed drawing of a basement wall assembly at the bottom. Key components shown here are a concrete foundation wall 44, foundation damp proofing 45, a diamond-shaped, two-layered netting 22, a filter fabric 46, a stone pad 47 and a perforated drain pipe 48. Other basement walls assemblies that can utilize a diamond-shaped, two-layered netting 22 include, but are not limited to block foundations, and ICF foundations. The diamond-shaped, two-layered netting 22 maintains a drainage space on the outside of the concrete foundation wall 44 for drainage, cross ventilation and compressive strength against soil and moisture pressure.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof including both structural equivalents and equivalent structures, material-based equivalents and equivalent materials, and act-based equivalents and equivalent acts.

The invention claimed is:

1. A drainage and ventilation mat for use in building construction, the mat adapted to be placed in a space between a building substrate and a building outer layer of material, comprising least two layers of parallel strands that are overlaid at an angle relative to each other and coupled to define a netting arrangement which provides moisture drainage and air movement, the netting arrangement being resistant to compression by the building substrate and the building outer layer, wherein each strand has a square cross-sectional geometry, and wherein the at least two layers of parallel strands are arranged so that they form parallelogram shaped apertures, the apertures each having one vertex oriented vertically downwardly, the mat netting arrangement being disposed between a building substrate and a B building outer layer, whereby when moisture accumulates in the space between the building substrate and the outer layer, the mat netting arrangement is configured to drain the moisture downwardly towards the downwardly oriented vertices of the apertures.

2. The drainage and ventilation mat of claim 1, wherein the building substrate is a substantially vertical wall sheathing, and wherein the building outer layer is selected from the group of materials consisting of underlayment, siding, block, brick, stone, lath, stucco, shingles, tiles, and panels.

3. The drainage and ventilation mat of claim 1, wherein the building substrate is a substantially non-horizontal roof sheathing which slants downwardly at an angle, and wherein the building outer layer is selected from the group of materials consisting of underlayment, shingles, tiles, and panels.

4. The drainage and ventilation mat of claim 1 wherein the at least two layers of parallel strands are arranged so that they form diamond-shaped apertures.

5. The drainage and ventilation mat of claim 4, wherein the diamond shaped apertures have two acute angles.

6. The drainage and ventilation mat of claim 1, wherein the at least two layers of parallel strands are extruded plastic netting.

7. The drainage and ventilation mat of claim 1, wherein the at least two layers are thermally bonded to each other.

8. The drainage and ventilation mat of claim 6, wherein the plastic netting is constructed of high density polyethylene (HDPE).

9. The drainage and ventilation mat of claim 8, wherein the plastic netting remains flexible to −40 degrees Fahrenheit.

10. The drainage and ventilation mat of claim 1 wherein the netting has a thickness between 0.1875 in. and 0.25 in.

11. The drainage and ventilation mat of claim 1, wherein the netting arrangement has a compressive strength such that it will maintain an airspace intact when compressed between the building substrate and the building outer layer.

12. The drainage and ventilation mat of claim 1, further comprising a scrim layer disposed on one side of the mat disposed towards the interior of the building.

13. The drainage and ventilation mat of claim 12, wherein the scrim layer is constructed of a fabric material.

14. The drainage and ventilation mat of claim 12, further comprising a weather resistive barrier (WRB) disposed on the opposite side of the mat disposed towards the exterior of the building.

15. A drainage and ventilation mat for use in building construction, the mat adapted to be placed in a space between a building substrate and a building outer layer of material, comprising
   a. a first layer of stranded material, the first layer of stranded material having a plurality of strands disposed a predetermined distance apart and parallel to each other;
   b. a second layer of stranded material, the second layer of stranded material having a plurality of strands disposed a predetermined distance apart and parallel to each other, the second layer of stranded material being overlaid on and bonded to the first layer of stranded material so that the stands are angled and form at least one vertex oriented vertically downwardly, and whereby the first and second layers define a netting arrangement with parallelogram shaped apertures including the downwardly oriented vertex, the netting arrangement being disposed between a building substrate and a building outer layer;
   c. the first and second layers of stranded material each having a square cross-sectional geometry;
   d. at least one scrim layer disposed on and parallel to the first and second layers of stranded material; and
   e. whereby the mat provides moisture drainage towards the downwardly oriented vertices and air movement between the building substrate and the building outer layer, the netting arrangement being resistant to compression by the building substrate and the building outer layer to form and maintain an airspace between the building substrate and the building outer layer.

16. A drainage and ventilation mat for use in building construction, the mat adapted to be placed in a space between a building substrate and a building outer layer of material, comprising
   a. a first layer of extruded high density polyethylene plastic stranded material, the first layer of stranded material having a plurality of strands disposed a predetermined distance apart and parallel to each other, each strand having a square crossection;
   b. a second layer of extruded plastic stranded material, the second layer of stranded material having a plurality of strands, each having a square crossection and disposed a predetermined distance apart and parallel to each other, the second layer of stranded material being overlaid on and thermally bonded to the first layer of stranded material so that the stands are angled and form at least one vertex oriented vertically downwardly, and whereby the first and second layers define a netting arrangement with diamond shaped apertures, including the downwardly oriented vertex, the netting arrangement being disposed between a building substrate and a building outer layer, wherein the netting has a thickness of between 0.1875 and 0.25 inches, and wherein the square cross-sectional geometry of the strands in the netting arrangement provide a compressive strength such that the netting arrangement will maintain an airspace intact when compressed between the building substrate and the building outer layer;
   c. at least one scrim layer constructed of a fabric material, disposed on one side of the mat, parallel to the first and second layers of stranded material;
   d. at least one weather resistive barrier (WRB) disposed on the opposite side of the mat, and disposed towards the exterior of the building; and
   e. whereby the mat provides moisture drainage towards the downwardly oriented vertices and air movement between the building substrate and the building outer layer, the netting arrangement being resistant to compression by the building substrate and the building outer layer.

* * * * *